Figure 1:
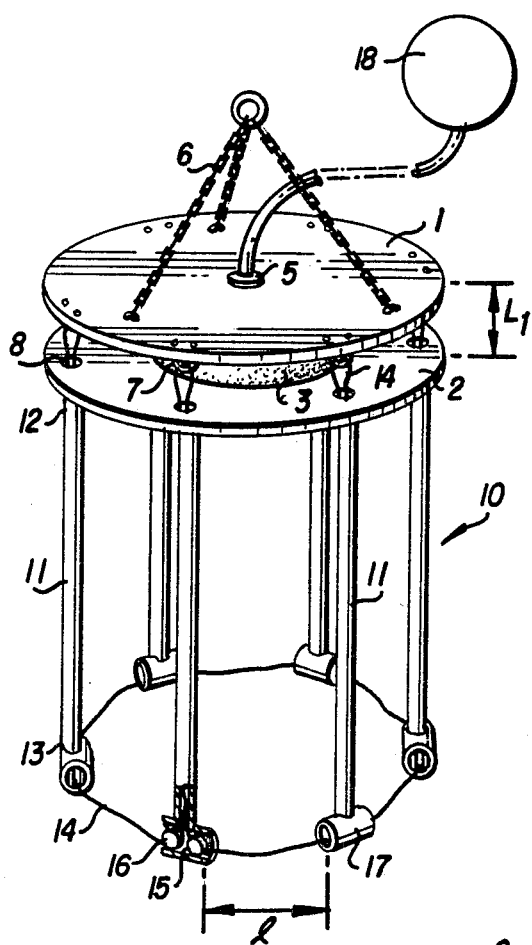

United States Patent [19]
Howard et al.

[11] Patent Number: 4,592,581
[45] Date of Patent: Jun. 3, 1986

[54] ENVELOPING GRIPPER

[75] Inventors: Frederick W. Howard, Woking; Keith T. Strong, Ashford, both of England

[73] Assignee: The Secretary of State for Defence in Her Britannic Majesty's Government of the United Kingdom of Great Britain and Northern Ireland, London, England

[21] Appl. No.: 705,013

[22] Filed: Feb. 25, 1985

[30] Foreign Application Priority Data

Mar. 21, 1984 [GB] United Kingdom ................. 8407306
Apr. 19, 1984 [GB] United Kingdom ................. 8410247
Aug. 9, 1984 [GB] United Kingdom ................. 8420291

[51] Int. Cl.$^4$ ........................ B25J 15/08; B66C 3/06
[52] U.S. Cl. ..................................... 294/2; 294/86.4; 294/88; 294/99.1; 294/111
[58] Field of Search ................. 294/1.1, 2, 64.1, 66.1, 294/67.3, 74–77, 86.4, 88, 99.1, 100, 106, 107, 111–113, 119.2, 120; 56/332, 333; 119/151, 153; 901/31, 36, 37, 39

[56] References Cited

U.S. PATENT DOCUMENTS

| | | | |
|---|---|---|---|
| 705,141 | 7/1902 | Rauch | 56/332 |
| 1,573,878 | 2/1926 | Smith | 294/112 X |
| 2,825,598 | 3/1958 | Nickolai | 294/75 |
| 2,891,815 | 6/1959 | McNamara | 294/111 X |
| 3,537,604 | 11/1970 | Whisler et al. | 294/74 X |
| 3,901,547 | 8/1975 | Skinner | 294/88 |
| 4,351,553 | 9/1982 | Rovetta et al. | 294/111 X |

FOREIGN PATENT DOCUMENTS

| | | |
|---|---|---|
| 2628514 | 1/1977 | Fed. Rep. of Germany . |
| 2940916 | 4/1981 | Fed. Rep. of Germany . |
| 880294 | 10/1961 | United Kingdom . |
| 2058714 | 4/1981 | United Kingdom . |

Primary Examiner—Johnny D. Cherry
Attorney, Agent, or Firm—Stevens, Davis, Miller & Mosher

[57] ABSTRACT

A remotely controllable gripper for picking up and setting down objects of various shapes and sizes, comprising a plurality of gripper arms which can be drawn together to enfold the object, by a continuous snare line attached to a support plate and engaged, via a parallel thrust plate, with each of the arms. The snare is tightened by increasing the separation of the thrust plate from the support plate by the operation of an interjacent bellows actuator.

8 Claims, 5 Drawing Figures

ENVELOPING GRIPPER

This invention relates to a remotely controllable gripping device capable of enveloping, picking up and setting down objects of various shapes and sizes.

A wide variety of gripping devices are known for remote handling. These fall within three general categories, namely, clamping, vacuum and magnetic grippers, the majority of which are capable of handling only objects of unique handling characteristics, eg dimension, shape, weight and crush resistance, to which the design can be specifically directed.

A few clamping grippers are known which are capable of operating over a limited range of dimensional variations. These are known as expanding grippers and usually include an expansion chamber actuating means, eg a bellows or a bladder, which may be expanded with compressed air to engage between the object and a circumscribing support member of fixed dimensions. The operating range of these expanding grippers is directly related to the expansion volume available and is limited in practice by the maximum volume of air that can be transferred to and from the expansion chamber in an acceptable time.

The present invention seeks to provide a clamping gripper of variable circumscribing dimensions having an operating range which is less constrained by the expansion volume of its actuating means, than is that of an expanding gripper.

In accordance with the present invention an enveloping gripper includes: a support plate and a thrust plate mutually located in substantially parallel confronting relationship by a linearly extendable actuating device adapted for adjusting the separation therebetween, the support plate being provided with a circumferential array of support reeving stations and the thrust plate having a corresponding confronting array of thrust reeving stations; a gripper arm engaged with the thrust plate adjacent each thrust reeving station and projecting in a direction away from the support plate so as to have a distal end remote therefrom, which distal end is provided with a distal reeving station; and a snare line reeved from each support reeving station via the confronting thrust reeving station and the distal reeving station of the immediately adjacent gripper arm to engage with the distal reeving station of the next adjacent gripper arm, thereby forming a circumferential snare at the distal ends of the gripper arms, which snare tightens to draw all the distal ends together when the thrust plate is driven away from the support plate by the actuating means.

Preferably the actuating means comprises a pneumatic actuator energisable from a compressed air supply, but when the gripper is to be used for lifting purposes, ie vertically, actuation may be alternatively accomplished by allowing the thrust plate to fall away from the support plate under its own dead weight to tighten the snare around an object, the snare being further tightened by the weight of the ensnared object during subsequent lifting.

In a first aspect of the invention each gripper arm preferably comprises a flexible tube, the portion of snare line interjacent the thrust reeving station and the distal reeving station being reeved through the length of the tube. This gripper may be additionally provided with a flexible skirt circumjacent the ring of gripper arms, for supplementary vacuum gripping purposes.

In a second aspect of the invention enabling the lifting of objects which may have projections extending beyond the circumference of the snare, each gripper arm preferably comprises a rigid tube pivotally connected to the thrust plate so as to pivot about an axis substantially tangential to the circumferential line of the thrust reeving stations, the tube containing an extension arm which is slideably protrusive from the distal end so as to extend beyond the snare.

The extension arm may conveniently be held captive when hanging at full extension from the pendent gripper arm by a tie means connected between the extension arm and the gripper arm and arranged to permit telescopic retraction of the extension arm by axial pressure, such as may be engendered by engagement with an obstruction during lowering of the gripper onto the object to be lifted.

Figure 2:
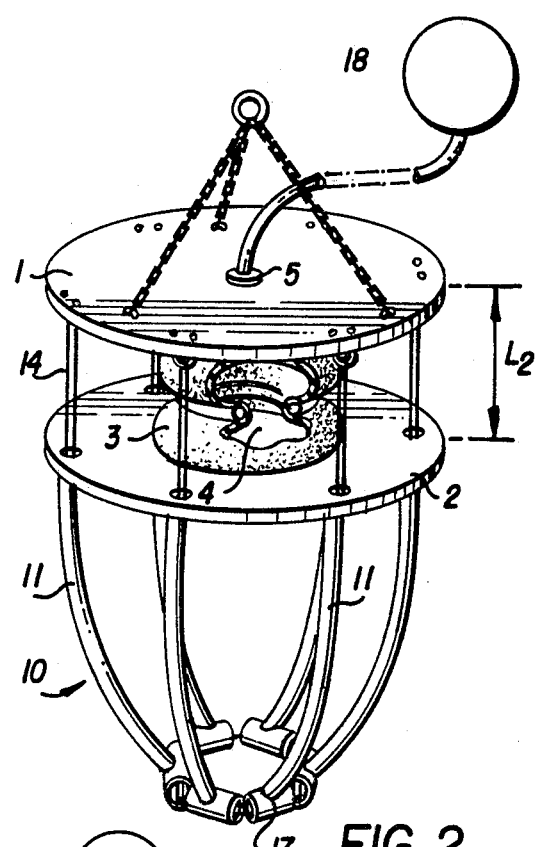
Figure 3:
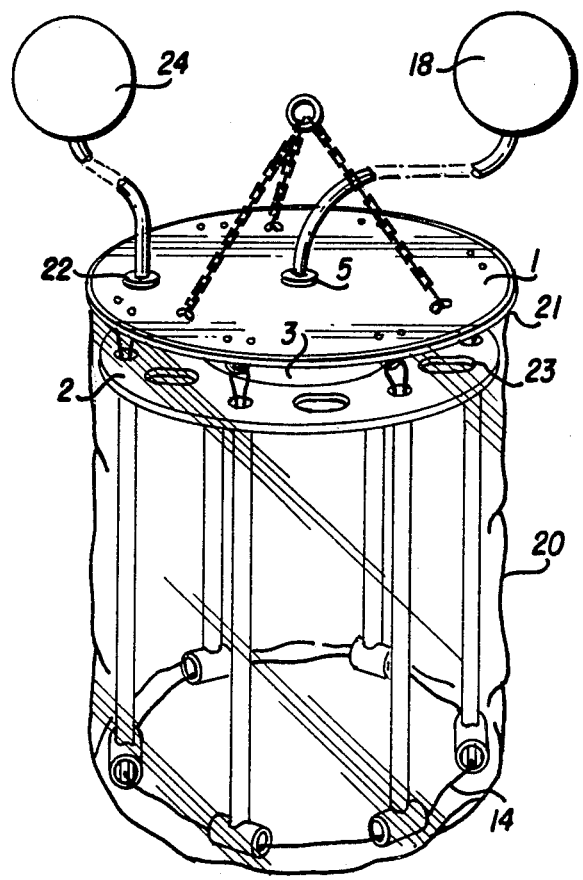

Embodiments of the invention will now be described by way of example only, with reference to the attached drawings of which FIG. 1 is a perspective view of an enveloping gripper arranged for lifting in accordance with the first aspect of the invention, and drawn in fully open condition, FIG. 2 is the same gripper drawn in fully closed condition, FIG. 3 is the same gripper additionally provided with supplementary vacuum gripping means.

Figure 4:
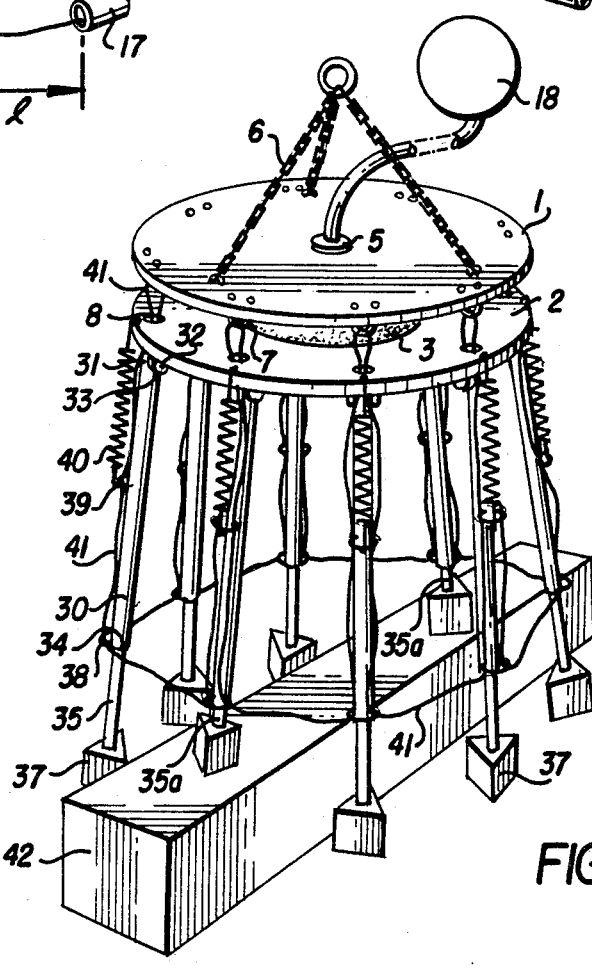
Figure 5:
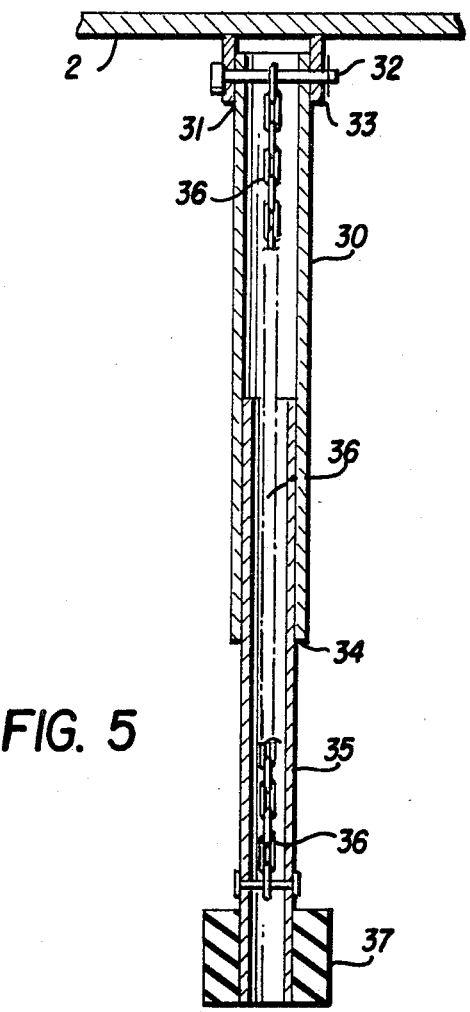

FIG. 4 is a perspective view of an enveloping gripper in accordance with the second aspect of the invention, drawn in fully open condition and disposed for lifting a projecting object, and FIG. 5 is an axially sectioned view of one of the gripper arms illustrated in FIG. 4.

The first embodiment illustrated in FIGS. 1 and 2 comprises a circular support plate 1 and a circular thrust plate 2 respectively attached in parallel relationship to the two ends of a pneumatic bellows actuator 3 having an expansion cavity 4 and an air transfer nozzle 5 emergent through the plate 1.

The support plate 1 is fitted with a suspension attachment 6 and carries a peripheral ring of reeving eyes 7 comprising the support reeving stations, in confrontation with the thrust plate 2, which plate 2 is provided with a corresponding ring of holes 8 comprising the thrust reeving stations.

Six gripper arms 10 are located beneath the thrust plate 2, each comprising a flexible tube 11 having a thrust end 12 engaged with the plate 2 in axial alignment with a respective one of the holes 8, and a distal end 13 remote therefrom defining the distal reeving station. The ends 12 of the tubes 11 are maintained in thrust against the plate 2 by a wire snare line 14 looped through each tube 11 in turn, the reeving sequence being; upwards through one tube 11, through the aligned holes 8, through the confronting eye 7 of the support plate 1, back through the same hole 8 and downwards through the same tube 11, and thereafter repeated similarly for each adjacent tube 11 in turn to form a continuous circumferential snare.

For lifting use, the suspension means 6 is slung from a robotic arm (not shown) or other lifting device and a compressed air supply from a remote compressor (18) is connected to the nozzle 5. When pressurised air is admitted to the chamber 4, the thrust plate 2 is driven away from the support plate 1 causing each tube 11 to be forced downwards along its contained loop of snare line 14 until the distal ends 13 are drawn tightly together, compressing the tubes 11 into rigid struts and ensnaring any object encompassed by them.

In order to ease running of the loop of snare line 14 through each tube 11, a block 15 supporting two sheaves 16 is fitted at the distal end 13. Alternatively, an internally radiused metal ferrule (not shown) may be inserted in the distal end. A resilient, tubular pad 17 surrounding each block 15 is provided to increase the grip of the snare upon the ensnared object.

When the support plate 1 is raised so as to lift the ensnared object, further tensioning of the snare line 14 is engendered by the weight of the object, proportionately increasing the gripping force applied to the object.

Release of the ensnared object is accomplished by exhausting the chamber 4 either to atmosphere or to a vacuum line. The second alternative is preferable in that the maximum available stroke length L of the bellows actuator 3 may be used.

This stroke length L dictates the maximum change in plate separation that can be achieved, ie $L = L_2 - L_1$, where $L_1$ and $L_2$ are the plate separations in the non-actuated and the actuated conditions respectively. L also determines the maximum separation l of each adjacent pair of distal ends 13 that can be achieved in the non-actuated condition, if full closure is to occur in the actuated condition.

The relationship between L and l is dependent upon the particular reeving method used and can be represented by $l = nL$, where n is the number of lengths of snare line 14 running between the two plates at each reeving station. In the embodiment previously discussed $n = 2$, but alternative arrangements having different n values are possible. For example, a separate single length of snare line 14 may be reeved through each tube 11 and secured at one of its ends to the reeving eye 7 and at the other to the distal end 13 of the next adjacent tube 11 to give a 1:1 relationship between l and L. Alternatively a 4:1 relationship can be obtained by fitting a double sheaved block (not shown) to the reeving eye 7 and an opposing single sheaved block (not shown) to the thrust plate adjacent the confronting hole 8 so as to permit an additional loop of snare line 14 interjacent the two plates 1 and 2 thereby providing four operative lengths of snare line between them.

The total number of gripper arms 10 can of course be increased in order to achieve a larger ensnaring circumference, ie a larger number of snare line lengths 1, for the same actuator stroke length L.

In one specific arrangement of this embodiment, a ring of six gripper arms, each of 40 cm in length and all circumferentially disposed upon a circle of 40 cm diameter, have been found capable of ensnaring and lifting objects of any shape that can be encompassed by the snare and of any weight up to a maximum of 35 kg, using a bellows actuator having a stroke length of 80 mm, a diameter of 80 mm and an actuating pressure of 4.2 bar providing a force load of 160 kg at the thrust plate.

An optional, supplementary feature capable of providing this embodiment with enhanced lifting power is illustrated in FIG. 3. This feature comprises a translucent, flexible skirt 20 located circumjacent the ring of gripper arms 10 and sealed to the rim of the support plate 1 by means of a clamping ring 21. Additionally a fluid transfer port and nozzle 22 is provided in the plate 1 for connection to an external fluid extraction means 24 eg a compressor, thereby to cause air to be drawn upwardly through the skirt 20 via ports 23 additionally provided in the thrust plate 2.

In use, as soon as an object has been ensnared by the gripper arms 10 in the manner already described with reference to FIGS. 1 and 2, the fluid extraction means 24 is activated so as to apply suction at the nozzle 22 and thereby cause the air pressure within the skirt to be reduced below atmospheric. The skirt 20 then collapses inwardly under the external air pressure, to fold itself against the ensnared object and provide a partial seal therewith. The negative pressure thereby imparted over the whole plan area of the object acts to provide supplementary support.

The relatively large lift area, ie the whole plan area of the object, made available in this arrangement permits the use of low powered fluid extraction means. For example, a compressor pulling 200 l/s at 2,000 N/m$^2$, used with a skirt of approximately 50 cm diameter circumjacent the specific six-armed arrangement previously described, will approximately double the lifting power of the gripper. This dual arrangement is additionally advantageous for the lifting of groups of smaller objects.

The second embodiment illustrated in FIGS. 4 and 5 has the same actuating components as the first embodiment, ie items 1 to 8, and differs only in the specific gripper arm arrangement.

In this embodiment eight reeving eyes 7 and holes 8 are provided in the plates 1 and 2 respectively and a rigid tubular gripper arm 30 is hinged at its upper end 31 to the underside of the plate 2 adjacent each hole 8 by means of a pin 32 and a bearing 33.

Slideably contained within the gripper arm 30 and protrusive from its distal end 34 is a tubular extension arm 35 which is anchored to the pin 32 by means of an internal chain 36 (FIG. 5). A grip pad 37, conveniently of triangular prism form, is secured to the protrusive end of the extension arm 35.

Each gripper arm 30 is provided with a reeving eye 38 at its distal end 34 and a subsidiary reeving eye 39 midway along its length. A tension spring 40 is attached between the eye 39 and the thrust plate 2 so as to hold the gripper arm 30 outwardly biased from the axis of the thrust plate 2.

A wire snare line 41 is reeved via the eyes 38 and 39, in similar manner to the snare line 14 of the first embodiment, ie upwards through the eyes 38 and 39, through the associated hole 8 of the thrust plate 2, through the confronting eye 7 of the support plate 1, back through the same hole 8 and downwards through the same eyes 39 and 38, the sequence being repeated thereafter for each adjacent gripper arm 30 in turn, so as to form a continuous circumferential snare, which can be tightened by increasing the distance between the plates 1 and 2 with the actuator 3.

When the gripper is lowered onto an object 42 having a major axis which is larger than the open diameter of the snare (as illustrated), any specific extension arm 35 that becomes axially obstructed by the object 42, eg arm 35a, is pushed upwards into its associated gripper arm 30, with the result that subsequent tightening of the snare to close the grip pads 37 of the unobstructed extension arms 35 against the sides of the object, is unimpeded.

We claim:

1. An enveloping gripper including: a support plate and a thrust plate mutually located in substantially parallel confronting relationship by a linearly extendable actuating device adapted for adjusting the separation therebetween, the support plate being provided with a circumferential array of support reeving stations and the thrust plate having a corresponding confronting array of thrust reeving stations; a gripper arm engaged with the thrust plate adjacent each thrust reeving station and projecting in a direction away from the support plate so as to have a distal end remote therefrom, which distal end is provided with a distal reeving station; and a snare line reeved from each support reeving station via the confronting thrust reeving station and the distal reeving station of the immediately adjacent gripper arm to engage with the distal reeving station of the next adjacent gripper arm, thereby forming a circumferential snare at the distal ends of the gripper arms, which snare tightens to draw all the distal ends together when the thrust plate is driven away from the support plate by the actuating device.

2. A gripper as claimed in claim 1 wherein each gripper arm comprises a flexible tube, the snare line interjacent the thrust reeving station and the distal reeving station being reeved therethrough.

3. A gripper as claimed in claim 1 further including a flexible skirt coaxially sealed to the support plate so as to extend axially therefrom circumjacent the thrust plate and the gripper arms; and a fluid extraction means for drawing fluid inwardly through the skirt and outwardly through the thrust plate and the support plate.

4. A gripper as claimed in claim 1 wherein each gripper arm comprises a rigid tube pivotally connected to the thrust plate so as to pivot about an axis substantially tangential to the circumferential line of the thrust reeving stations.

5. A gripper as claimed in claim 4 wherein each gripper arm contains an extension arm which is slideably protrusive from the distal end so as to extend beyond the snare.

6. A gripper as claimed in claim 5 wherein the extension arm is held captive when at full extension from the gripper arm by a tie means connected therebetween.

7. A gripper as claimed in claim 1 wherein the actuating means comprises a pneumatic actuator energisable by a compressed air supply.

8. A gripper as claimed in claim 1 wherein the snare line is continuous, being reeved through each two consecutive support reeving stations via the intervening thrust and distal reeving stations of the two respective gripper arms.

* * * * *